ST VRAIN LE SIEUR.
VACUUM MILK CAN.
APPLICATION FILED OCT. 28, 1912.
1,195,243.  Patented Aug. 22, 1916.
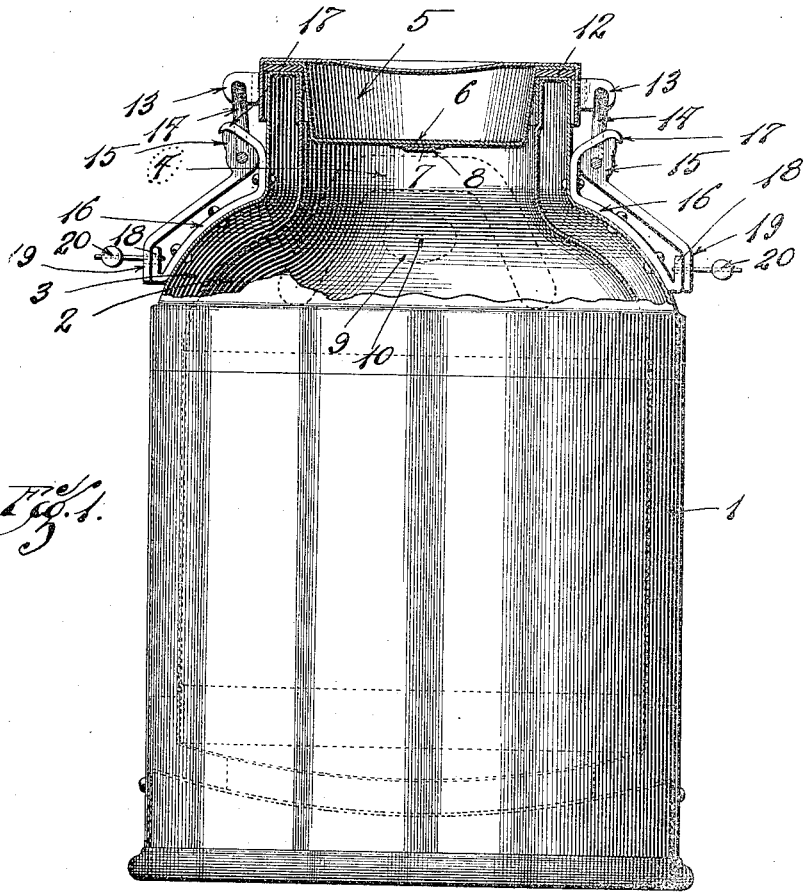
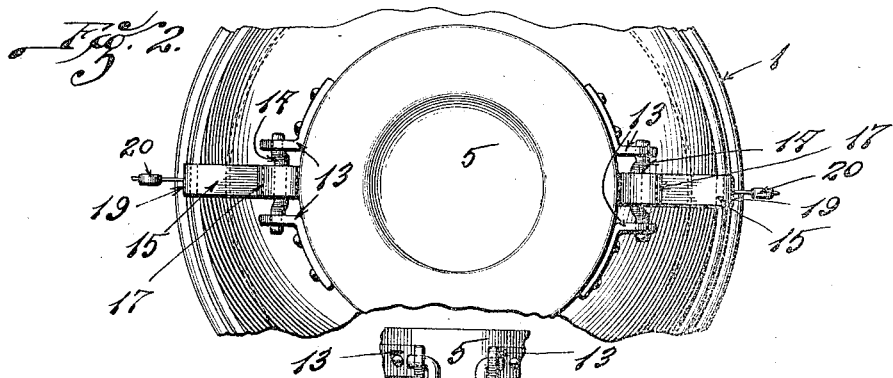
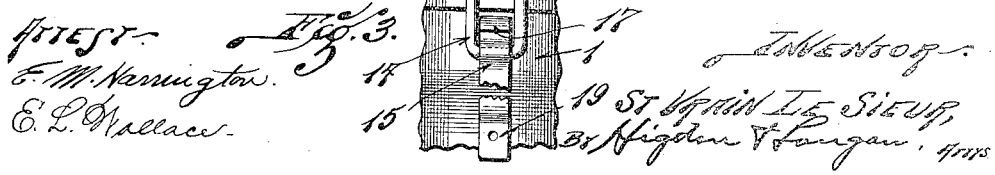

UNITED STATES PATENT OFFICE.

ST. VRAIN LE SIEUR, OF NEW ATHENS, ILLINOIS, ASSIGNOR TO THE LE SIEUR VACUUM CAN MANUFACTURING COMPANY, OF EAST ST. LOUIS, ILLINOIS, A CORPORATION OF ILLINOIS.

VACUUM MILK-CAN.

1,195,243. Specification of Letters Patent. Patented Aug. 22, 1916.

Application filed October 28, 1912. Serial No. 728,116.

*To all whom it may concern:*

Be it known that I, ST. VRAIN LE SIEUR, a citizen of the United States, and resident of New Athens, St. Clair county, Illinois, have invented certain new and useful Improvements in Vacuum Milk-Cans, of which the following is a specification containing a full, clear, and exact description, reference being had to the accompanying drawings, forming a part hereof.

My invention relates to improvements in vacuum milk cans, and consists in the novel construction and combination of parts hereinafter set forth and pointed out in the appended claim.

The object of my invention is to provide an improved vacuum milk can for use in shipping and storing milk and cream and preserving the contents against fermentation and other deleterious effects caused by heat.

A further object is to provide a vacuum milk can which will be strong, durable, and cheap in construction, and which will be highly efficient and convenient in operation.

In the drawings: Figure 1 is a sectional elevation of a vacuum milk can having my invention applied thereto; Fig. 2 is a top plan view of the same, with parts broken away; and Fig. 3 is a detail side elevation of a portion of the upper end of the can, illustrating the means for clamping and sealing the cover.

1 indicates the outer can, and 2 the inner can, the two cans being separated by a space 3 from which the air is exhausted.

It is very important, in a vacuum milk can, that the inner can be insulated from the outer can, to prevent the conduction and radiation of heat from the external can to the internal can, and in carrying out my invention I have carefully insulated the inner can. The outer can 1 is made of very strong sheet metal. The can is provided with the usual handles 4.

The numeral 5 indicates a vacuum cover in the form of a hollow cylindrical body from which the air is exhausted. Said cover projects downwardly within the neck of the inner can, and said cover is also provided with an exterior depending flange 11 which extends downwardly a considerable distance upon the neck of the outer can.

Formed in the lower end of the cover is a sealing aperture 6, through which the air is to be exhausted, and which is sealed after exhaustion by means of a rubber or other flexible sealing disk 7 placed over said aperture and concealed and protected by means of a metallic protecting plate 8 which is placed over said disk 7 and has its marginal edges soldered to the metal cover in the manner specifically described and claimed in my co-pending application, filed October 19, 1912, Serial No. 726,633.

The numeral 9 indicates another sealing and protecting plate placed over an aperture 10 on the breast of the outer can beneath one of the handles 4, for the purpose of sealing the said aperture 10 after the air has been exhausted from the space between the said outer and inner cans.

The cover 5 when in use is adapted to be hermetically sealed and placed on the upper end of the can necks, by being forcibly clamped into position upon said necks, as shown, thereby clamping a gasket or packing ring 12 securely in position between said cover and the metal at the upper ends of said necks.

The means for clamping the cover in position I will now proceed to describe, as follows: The numeral 13 indicates opposite perforated ears projecting from the outer periphery of the cover 5, and depending from the perforations in said ears are common links, 14, the lower ends of which carry the clamping levers 15. Both outer and inner cans have conical breasts. Fixed on the outer surface of the breast of the outer can, by means of solder or any other suitable fastening means, are the clamping brackets 16, the opposite ends of which are provided with out-turned portions 17 and 18. The out-turned portion 17 of said brackets 16 lie in a plane so that the inner ends of the locking levers 15 may engage beneath said out-turned portion 17 and forcibly clamp the cover in position upon the can when the said locking levers 15 are thrown downwardly. The lower ends of said locking levers 15 are provided with a down-turned portion 19, which is perforated for the reception of a common sealing device 20, which latter is to be passed through the perforation in said inturned portion 19 of said levers, and also through a registering aperture formed in the adjacent out-turned portion of the clamping brackets, for the purpose of sealing the can whenever required, or for the purpose of locking the can by means of common pad-locks.

The operation of my invention is obvious and need not be described further in detail, except to say that milk placed within the inner can, at a lower temperature than the external atmosphere, will retain its temperature with but slight variation for a considerable period, since the space 3 presents a guard or protecting medium of an indifferent heat conducting quality. Milk cans constructed as described will be specially valuable in transporation, as they will serve to keep the milk in a fresh and cool condition throughout and after the period of transit. The said clamping brackets 16 act as braces for the neck and breast of the outer can, extending as they do downwardly a considerable distance upon the breast of the can. This manner of bracing the breast is a very important feature, as statistics show that the destruction of ninety per cent. of the milk cans during use has been caused by forcing the neck of the can down through the breast of the can. By the present mode of shipping milk cans they are stacked one upon another until the weight of several cans rest upon the neck and breast of the lowermost can.

I claim:

In a vacuum milk can, the combination of vacuum-retaining outer and inner cans separated by a space from which the air is to be exhausted, conical-breasts for said cans, a vacuum-containing cover constructed to be clamped and hermetically sealed in position upon the upper end of said inner and outer cans, combined strengthening and clamping brackets fixed in a vertical position upon the upper portion of said outer can and adapted to strengthen the same and to assist in hermetically sealing the said cover, and locking levers pivotally connected to said cover and to said clamping and strengthening brackets to clamp and lock the cover in place.

In testimony whereof, I have signed my name to this specification, in presence of two subscribing witnesses.

ST. VRAIN LE SIEUR.

Witnesses:
E. L. WALLACE,
JOHN C. HIGDON.

Copies of this patent may be obtained for five cents each, by addressing the "Commissioner of Patents, Washington, D. C."